United States Patent
Narayanan et al.

(10) Patent No.: US 11,029,800 B2
(45) Date of Patent: Jun. 8, 2021

(54) LANGUAGE AND SECURITY AWARE SEARCH FOR USER NAVIGABLE ENTRY POINTS

(71) Applicant: Microsoft Technology Licensing, LLC, Redmond, WA (US)

(72) Inventors: Suriya Narayanan, Redmond, WA (US); Anton Shakirzianov, Seattle, WA (US); Adrian L. Orth, West Fargo, ND (US); Sridhar Srinivasan, Sammamish, WA (US); Matthew R. Maertens, Redmond, WA (US); Jeremy Joe Jensen, Redmond, WA (US); Katherine Spengler, Kirkland, WA (US); Anees Ansari, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1058 days.

(21) Appl. No.: 14/800,416

(22) Filed: Jul. 15, 2015

(65) Prior Publication Data

US 2016/0275189 A1    Sep. 22, 2016

Related U.S. Application Data

(60) Provisional application No. 62/133,877, filed on Mar. 16, 2015.

(51) Int. Cl.
*G06F 3/0481* (2013.01)
*G06F 3/0482* (2013.01)
(Continued)

(52) U.S. Cl.
CPC .......... *G06F 3/0481* (2013.01); *G06F 3/0482* (2013.01); *G06F 16/16* (2019.01);
(Continued)

(58) Field of Classification Search
CPC .......... G06F 17/30371; G06F 11/1412; G06F 16/00; G06F 3/00; G06F 40/00
(Continued)

(56) References Cited

U.S. PATENT DOCUMENTS 7,543,238 B2   6/2009   Alcazar et al.
8,321,443 B2   11/2012  Andrade et al.
(Continued)

OTHER PUBLICATIONS

Krishnaprasad, et al., "Searching Enterprise Applications (Siebel 7.8 and E-Business Suite 11i) with Oracle Secure Enterprise Search 10.1.8", In White Paper of Oracle, Jan. 2007, 26 pages.
(Continued)

*Primary Examiner* — Hares Jami
*Assistant Examiner* — Alicia M Antoine
(74) *Attorney, Agent, or Firm* — Christopher J. Volkmann; Kelly, Holt & Christenson, PLLC

(57) ABSTRACT

A search user input mechanism is displayed on a user interface display. User actuation of the search user input mechanism is detected, to identify a query for a navigation structure that identifies an entry point into an application in the computing system. A path navigation hierarchy is searched to identify the entry point and the path in the navigation hierarchy where the entry point is located. A navigable search result is displayed to the user for actuation, to navigate to the entry point.

18 Claims, 18 Drawing Sheets

(51) Int. Cl.
  *G06F 40/263*  (2020.01)
  *G06F 16/00*  (2019.01)
  *G06F 16/332*  (2019.01)
  *G06F 16/16*  (2019.01)
  *G06F 16/242*  (2019.01)

(52) U.S. Cl.
  CPC ...... *G06F 16/2428* (2019.01); *G06F 16/3323* (2019.01); *G06F 40/263* (2020.01)

(58) Field of Classification Search
  USPC .......................................................... 707/691
  See application file for complete search history.

(56) References Cited

U.S. PATENT DOCUMENTS

| | | | |
|---|---|---|---|
| 8,707,198 B2 | 4/2014 | Jiang et al. | |
| 2005/0149496 A1 | 7/2005 | Mukherjee et al. | |
| 2008/0294602 A1* | 11/2008 | Permandla | G06F 16/35 |
| 2009/0144280 A1 | 6/2009 | Su | |
| 2012/0254801 A1 | 10/2012 | Gaffney et al. | |
| 2013/0238662 A1* | 9/2013 | Ursal | G06F 21/604 |
| | | | 707/792 |
| 2014/0095253 A1* | 4/2014 | Demele | G06Q 30/0201 |
| | | | 705/7.29 |
| 2014/0096024 A1* | 4/2014 | Laurent | G06F 21/128 |
| | | | 715/739 |
| 2014/0114946 A1* | 4/2014 | Ture | G06F 17/30864 |
| | | | 707/709 |
| 2014/0136543 A1* | 5/2014 | Frieden | G06F 16/90324 |
| | | | 707/741 |
| 2014/0201181 A1* | 7/2014 | Agarwal | G06F 16/3322 |
| | | | 707/706 |
| 2014/0244613 A1* | 8/2014 | Rajasekhar | G06F 17/30398 |
| | | | 707/706 |
| 2014/0258212 A1 | 9/2014 | Kunert et al. | |
| 2014/0359519 A1 | 12/2014 | Luu et al. | |
| 2015/0169385 A1* | 6/2015 | Allen | G06F 9/541 |
| | | | 719/328 |
| 2016/0026710 A1* | 1/2016 | Laredo | G06F 16/367 |
| | | | 707/748 |
| 2016/0267153 A1* | 9/2016 | Witkop | G06Q 10/00 |

OTHER PUBLICATIONS

"The Best-Run Businesses Run SAP", Published on: Nov. 5, 2012 Available at: http://help.sap.com/saphelp_nw73ehp1/helpdata/en/4c/5bd92497817511e10000000a42189b/content.htm.

Aksyonoff, Andrew., "Sphinx 2.2.7—Release Reference Manual", Retrieved on: Feb. 20, 2015 Available at: http://sphinxsearch.com/docs/current.html#rt-internals.

"PeopleTools 8.52: PeopleSoft Application User's Guide", Retrieved on: Feb. 20, 2015 Available at: https://docs.oracle.com/cd/E41509_01/pt852pbh2/eng/psbooks/tupa/chapter.htm?File=tupa/htm/tupa02.htm.

"Using the JD Edwards EnterpriseOne Web Application User Interfaces", Published on: Jan. 9, 2012 Available at: https://docs.oracle.com/cd/E17984_01/doc.898/e14710/jde_el_web_user_interface.htm#g8d6ab57f7cedeaac_ef90c_10a77c8e3f7_70d9.

"Filtering Entry Points", Retrieved on: Feb. 20, 2015 Available at: https://help.sap.com/saphelp_nw73/helpdata/en/7a/0d3fd577184217abf672883ffd5c57/content.htm.

"Fast Path", Published on: Feb. 18, 2012 Available at: https://docs.oracle.com/cd/E24705_01/doc.91/e245251/jde_el_web_user_interface.htm#EOTFO00024.

* cited by examiner

FIG. 4F

| ACCOUNT | NAME | INVOICE ACCOUNT | CUST | | |
|---|---|---|---|---|---|
| DE-001 | Contoso Europe | | 90 | EUR | 012 |
| US-001 | Contoso Retail San Diego | | 30 | USD | 321 |
| US-002 | Contoso Retail Los Angeles | | 30 | USD | 123 |
| US-003 | Forest Wholesales | | 10 | USD | 123 |
| US-004 | Cave Wholesales | | 10 | USD | 123 |
| US-005 | Contoso Retail Seattle | | 30 | USD | 123 |
| US-006 | Contoso Retail Portland | | 10 | USD | 123 |
| US-007 | Desert Wholesales | | 30 | USD | 123 |
| US-008 | Sparrow Retail | | 30 | USD | 123 |
| US-009 | Owl Wholesales | | 10 | USD | 123 |

Form information
Form Name: CustTable
Control Name: CustomerFilterGroup DRESS

Bahnhofstrasse 5
79539 Berlin
DEU

RECENT ACTIVITY
RELATIONSHIPS
STATISTICS
CONTACTS
RECURRING INVOICE TEMPLATE
CLASSIFICATION BALANCES 258
260

All CUSTOMERS
Filter
New   Delete   CUSTOMER   SELL   INVOICE   COLLECT   PROJECTS   SERIVICE   MARKET   RETAIL   GENERAL   OPTIONS File Edit View Favorites Tools Help Previous   Next Navigation Hierarchy (Menu)

```xml
<?xml version="1.0" encoding="utf-8"?>
<AxMenu xmlns:i="http://www.w3.org/2001/XMLSchema-instance" xmlns="Microsoft.Dynamics.Ax.Metadata.V1">
  <Name>SalesAndMarketing</Name>
  <Label>@SYS334250</Label>
  <SetCompany>Yes</SetCompany>
  <Elements>
    <AxMenuElement xmlns=""
      i:type="AxMenuElementSubMenu">
      <Name>Workspaces</Name>
      <Label>@SYS:Platorm_Menu_ColHeading_Workspaces</Label>
      <Elements>
        <AxMenuElement xmlns=""
          i:type="AxMenuElementTile">
          <Name>SalesOrderProcessingWorkspace</Name>
          <Tile>SalesOrderProcessingWorkspace</Tile>
        </AxMenuElement>
        <AxMenuElement xmlns=""
          i:type="AxMenuElementTile">
          <Name>SalesSetupWorkspace</Name>
          <Tile>SalesSetupWorkspace</Tile>
        </AxMenuElement>
        <AxMenuElement xmlns=""
          i:type="AxMenuElementTile">
          <Name>SalesPricingWorkspaceTile</Name>
          <Tile>SalesPricingWorkspaceTile</Tile>
        </AxMenuElement>
      </Elements>
    </AxMenuElement>
    <AxMenuElement xmlns="" i:type="AxMenuElementSu">...</AxMenuElement>
    <AxMenuElement xmlns="" i:type="AxMenuElementSu">...</AxMenuElement>
    <AxMenuElement xmlns="" i:type="AxMenuElementSu">...</AxMenuElement>
    <AxMenuElement xmlns="" i:type="AxMenuElementSu">...</AxMenuElement>
    <AxMenuElement xmlns="" i:type="AxMenuElementSu">...</AxMenuElement>
    <AxMenuElement xmlns="" i:type="AxMenuElementSu">...</AxMenuElement>
  </Elements>
</AxMenu>
```

FIG. 5C

LANGUAGE AND SECURITY AWARE SEARCH FOR USER NAVIGABLE ENTRY POINTS

CROSS-REFERENCE TO RELATED APPLICATION

The present application is based on and claims the benefit of U.S. provisional patent application Ser. No. 62/133,877, filed Mar. 16, 2015, the content of which is hereby incorporated by reference in its entirety.

BACKGROUND

Computing systems are currently in wide use. Many such computing systems are deployed with a very large number of entry points. This can present some difficulties for users.

Each entry point may generally represent a capability. For instance, in a computing system that allows a user to submit documentation through a process, the user normally accesses this process through an entry point. Such entry points are often protected through security roles and permissions and can be organized in a hierarchy of navigation structures that define the user interface to the computing system. Menus are examples of such navigation structures.

A user who uses such a relatively large and complex computing system may expend a great deal of time and effort attempting to locate entry points in order to perform actions within the computing system or using the computing system. In addition, entry points can change dynamically, over time, as features and capabilities are added or updated within the computing system. This makes it even more difficult for users to find desired entry points.

The discussion above is merely provided for general background information and is not intended to be used as an aid in determining the scope of the claimed subject matter.

SUMMARY

A search user input mechanism is displayed on a user interface display. User actuation of the search user input mechanism is detected, to identify a query for a navigation structure that identifies an entry point into an application in the computing system. A path navigation hierarchy is searched to identify the entry point and the path in the navigation hierarchy where the entry point is located. A navigable search result is displayed to the user for actuation, to navigate to the entry point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4A-4F are examples of user interface displays.

FIG. 5C shows one example of a metadata structure for an entry point that includes a navigation hierarchy, such as a menu.

DETAILED DESCRIPTION

In one example described herein, each entry point has an associated description. The description may be in multiple different languages. For instance, there can be a separate description in English, German, French and Spanish, etc. Of course, this is only an example set of languages, and a wide variety of others could be used as well.

Figure 1:
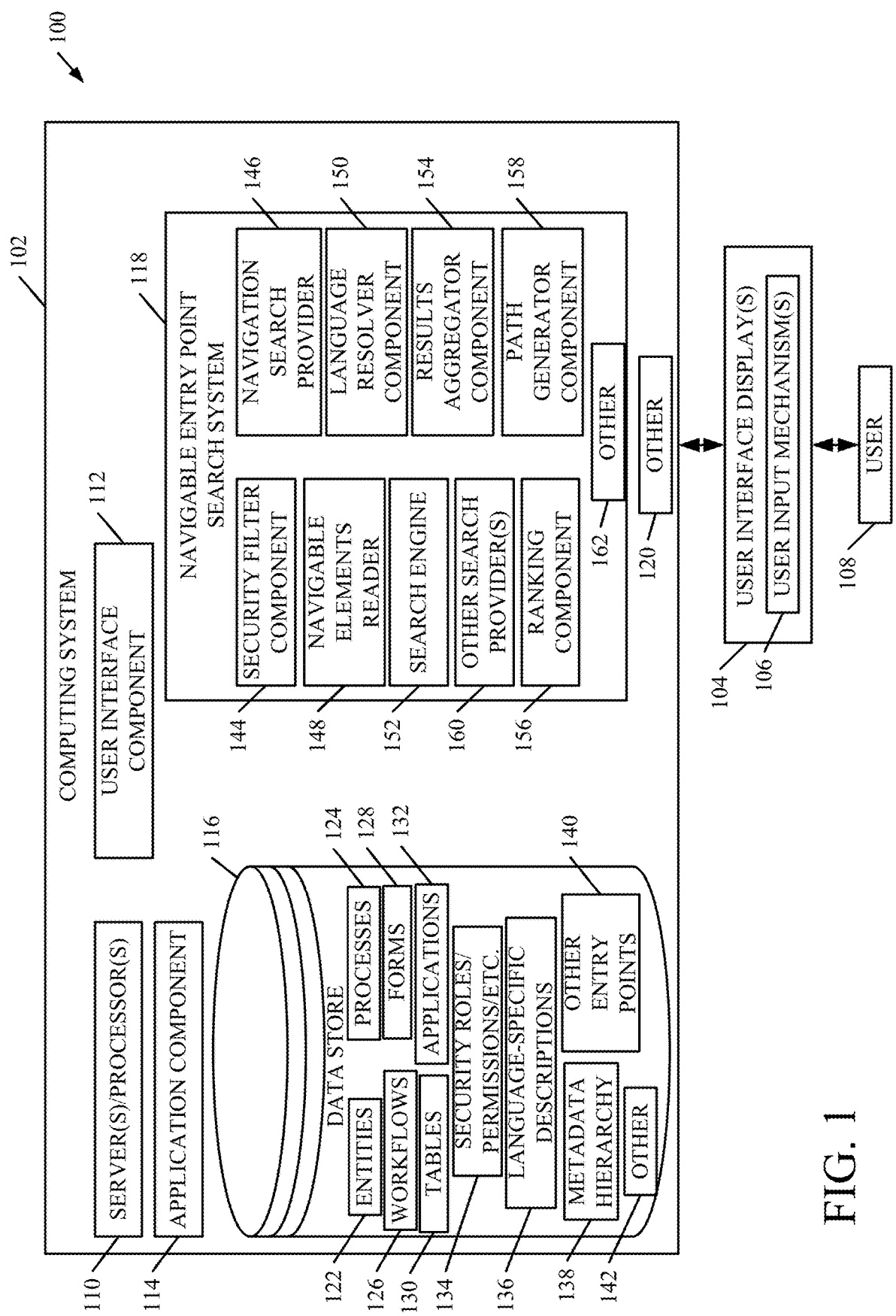
FIG. 1 is a block diagram of one example of an entry point search architecture.

FIG. 1 is a block diagram of one example of an entry point search architecture 100. Architecture 100 shows computing system 102 generating user interface displays 104 with user input mechanisms 106 for interaction by user 108. User 108 illustratively interacts with user input mechanisms 106 in order to control and manipulate computing system 102.

Computing system 102, itself, illustratively includes servers or processors 110, user interface component 112, application component 114, data store 116 and navigable entry point search system 118. It can also include other items 120.

Data store 116, in one example, illustratively includes entities 122, processes 124, workflows 126, forms 128, tables 130, applications 132, security roles 134, language-specific descriptions 136, a metadata hierarchy 138 and other entry points 140. It can include other records or other items 142 as well.

Navigable entry point search system 188 illustratively includes security filter component 144, navigation search provider 146, navigable elements reader 148, language resolver component 150, search engine 152, results aggregator component 154, ranking component 156, and path generator component 158. It can illustratively include other search providers 160, and other items 162, as well.

Before describing the overall operation of navigable entry point search system 118 in more detail, a brief overview of some of the items in computing system 102 will first be provided. Application component 114 illustratively runs applications 132 in order to perform processes 124, workflows 126, etc. In doing so, it can operate on entities 122, and it can display forms 128 that may be used for surfacing information to user 108. It can also access metadata hierarchy 138 which illustratively describes various items in applications 132 and data store 116, in a hierarchical metadata structure. For instance, metadata hierarchy 138 may include a hierarchical structure that defines the various user interface elements that are surfaced by applications 132. The hierarchy 138 may, for instance, include a main menu node that has sub-nodes that describe the various elements that comprise a main menu. The descendent nodes in the hierarchy may identify menu extensions as well. Security roles and permissions, etc. 134, may describe the various security roles that can be assigned to the users of computing system 102. It may also include a set of permissions corresponding to each of those roles, so that certain users (who have certain roles) can only see information that they are allowed to see, given the corresponding permissions.

Language-specific descriptions 136 may be, for instance, textual strings that contain descriptions in various languages, for a user interface element. For example, an element may have a label, and the label may include a map to text files that hold the descriptions in various languages. Given the particular language of user 108, the appropriate text file will be returned for those labels, in the desired language.

Certain computing systems may have many different entry points. For instance, some enterprise applications may have thousands of different forms 128, each of which have hundreds of controls. It can thus be very difficult for user 108 to locate a particular entry point.

Navigable entry point search system 118 illustratively generates user interface displays, with a search user input mechanism, that allows user 108 to search for various entry points within computing system 102 (and specifically within the applications 132 run by computing system 102). Navigation search provider 146 illustratively receives a query from user 108, through the user input mechanism, and guides search engine 152 to search for navigable elements (e.g., navigation structures) within metadata hierarchy 138. Navigable elements reader 148 reads the elements and language resolver component 150 identifies the particular language-specific description 136 that corresponds to the navigable elements. Ranking component 156 ranks the navigable elements based on how closely they match the received query. Path generator component 158 identifies a navigation path through which a user can navigate to arrive at the entry point represented by the navigable element, and generates a visual representation of the identified navigation path. Security filter component 144 applies security permissions to the results (e.g., navigable elements) returned by search engine 152 and ranked by ranking component 156. Results aggregator component 154 can also receive search results provided by other search providers 160 and surface them, after the security filter has been applied, for user 108. User 108 can then actuate any one of the navigable elements surfaced in the search results to navigate to the corresponding entry point.

Figure 2A:
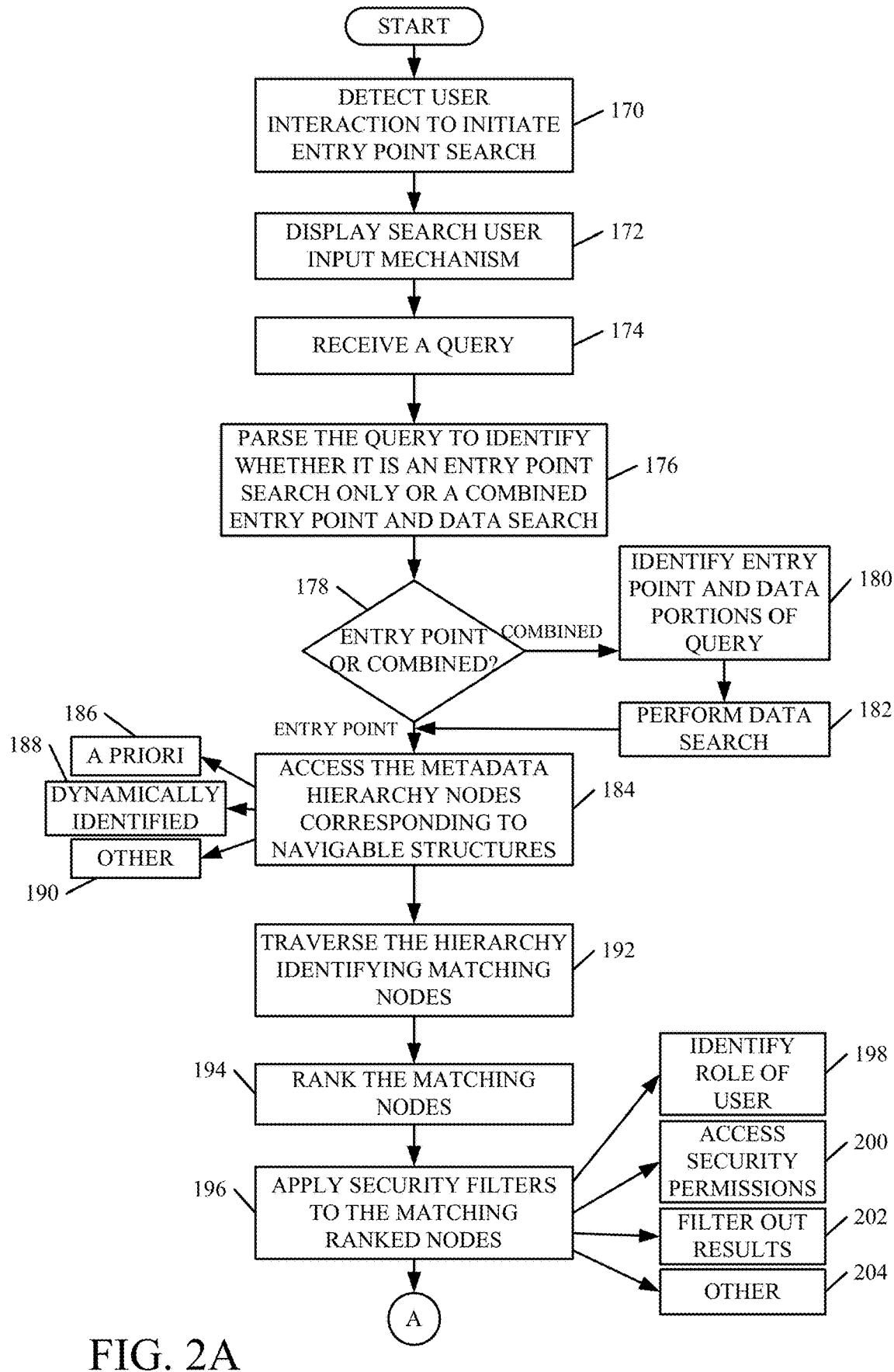
FIGS. 2A and 2B (collectively referred to herein as FIG. 2) show a flow diagram illustrating one example of the operation of a navigable entry point search system shown in FIG. 1.
Figure 2B:
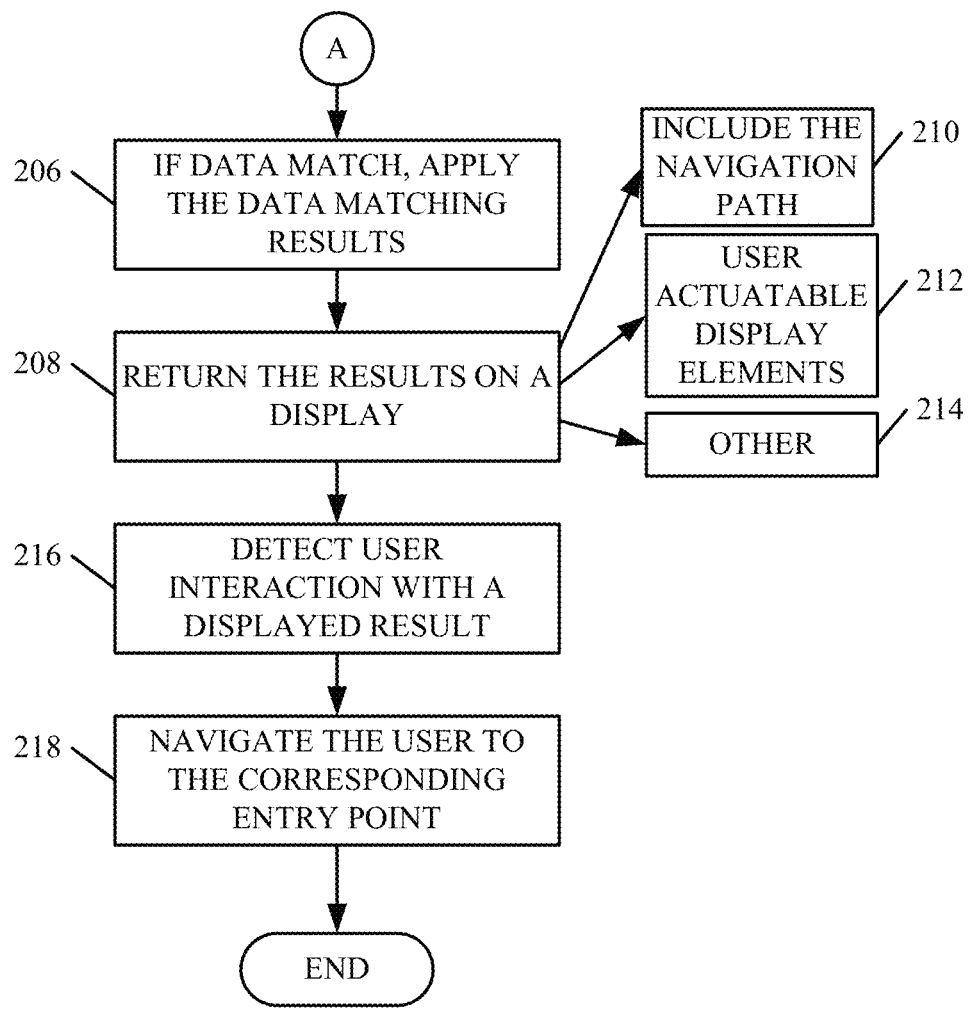

FIGS. 2A and 2B (collectively referred to herein as FIG. 2) illustrate the operation of navigable entry point search system 118 in more detail. Navigable entry point search system 118 first detects user interaction by user 108, indicating that the user 108 wishes to search for an entry point. This is indicated by block 170 in FIG. 2. Search engine 152 then displays a search user input mechanism (such as a search box in which the user can type a query, etc.). This is indicated by block 172.

Search engine 152 then receives the query input by the user as indicated by block 174. It parses the query to identify whether it is an entry point search only, or a combined entry point and data search. This is indicated by block 176. For instance, it may be that the user is simply looking for an entry point, such as a menu that has the description "Past Due Invoices". In that case, search engine 152 identifies that the user is only searching for an entry point (the "Past Due Invoices" menu item). However, it may also be that the user is looking for the "Past Due Invoices" entry point for a specific customer. Therefore, the user may input a search query that indicates that (such as an input identifying the entry point and naming the specific customer). In that case, search engine 152 identifies the search as a combined entry point and data search.

If, at block 178, it is determined that the search is a combined search, then search engine 152 identifies the entry point portion of the query and the data portion of the query, as indicated by block 180. This can be done using a natural language understanding component, or another kind of parser or linguistic analyzer. It then uses other search providers 160 to perform the data search. This is indicated by block 182. The data search may, for instance, return a set of records that correspond to the identified customer that was input in the query. Those search results can be combined (e.g., intersected) with search results returned based on the entry point search, to obtain a final set of search results. This is described in greater detail below.

If, at block 178, the search has been identified as being an entry point only search (or if it has been identified as a combined search but the entry point only search criteria have been identified in the query), then navigation search provider 146 guides search engine 152 to search through only information in metadata hierarchy 138 that corresponds to the entry points within computing system 102. Accessing the metadata hierarchy nodes corresponding to navigable structures (e.g., entry points) is indicated by block 184 in FIG. 2.

In one example, the particular types of hierarchy nodes that correspond to navigable structures (e.g., entry points) are known a priori. This is indicated by block 186. On the other hand, they may be dynamically identified as well, as indicated by block 188. The metadata hierarchy nodes that are identified may also be identified in other ways, as indicated by block 190.

Navigation search provider 146 then guides search engine 152 to navigate the hierarchical structure starting from the ancestor nodes identified at block 184, to leaf nodes in the hierarchical structure. In doing so, navigable elements reader 148 reads the navigable elements in the metadata hierarchy structure being searched and uses language resolver component 150 to resolve the particular language corresponding to those items, and to return the text describing the hierarchical nodes, in the desired language. Search engine 152 then matches those descriptions against the query to identify matching nodes. This is indicated by block 192.

Ranking component 156 then ranks the matching nodes as indicated by block 194. This can be done using a wide variety of different ranking criteria. For instance, search engine 152 may identify a node as a matching node if the search query term appears in the navigation path that leads to that node. It may also identify a node as a matching node if the search query term appears at the leaf node itself. In this case, ranking component 156 may identify the latter matching node as a higher ranking node, because the leaf node, itself, matches the search query. It may identify the former node as a lower ranking node, because the match occurred in the navigation path that leads to the leaf node, instead of at the leaf node itself. Of course, this is only one set of criteria by which to rank the matching results.

When the search results (e.g., the matching nodes) have been ranked, then security filter component 144 applies security filters to the matching, ranked nodes. This is indicated by block 196. In doing so, it can identify a role associated with user 108, as indicated by block 198. It can access security permissions or other role-based security mechanisms, as indicated by block 200. It can filter out any results that user 108 does not have permission to see, or access. This is indicated by block 202. Of course, the security filters can be applied in other ways as well, and this is indicated by block 204.

If the query received is also a data query (as determined at block 178), then the data search results are combined with the entry point search results to identify a combined set of search results that match both the entry point query terms and the data query terms. If desired, those results can be re-ranked based on the combination of the search results. Applying the data matching results is indicated by block 206. It will also be noted, of course, that intersecting the two sets of results to identify results that contain matches to both the entry point query terms and the data query terms is only one way of combining the results from the entry point search and the data search. They can be combined in an additive way in which the search results are simply combined together as a superset of results, or in other ways, as well.

The entry point search results are then returned on a display, to user 108. This is indicated by block 208. In doing so, path generator component 158 can generate the visual representation of the navigation path associated with each of the matching results and provide it to results aggregator component 154. Component 154 can receive search results from other search providers 160 as well. Results aggregator component 154 can then surface the results for user 108. The results can include the navigation path for each of the results, as indicated by block 210. The results can be surfaced as user actuatable display elements (or navigation elements) as indicated by block 212. They can be surfaced in other ways as well, and this is indicated by block 214.

Application component 114 can then detect user actuation with any of the search results. For instance, if the user actuates (such as clicks, taps, double clicks, etc.) on one of the actuatable display elements in the search results, this can be detected as a user interaction with that search result. This is indicated by block 216. Application component 116 can then navigate the user to the corresponding entry point. This is indicated by block 218.

Figure 3:
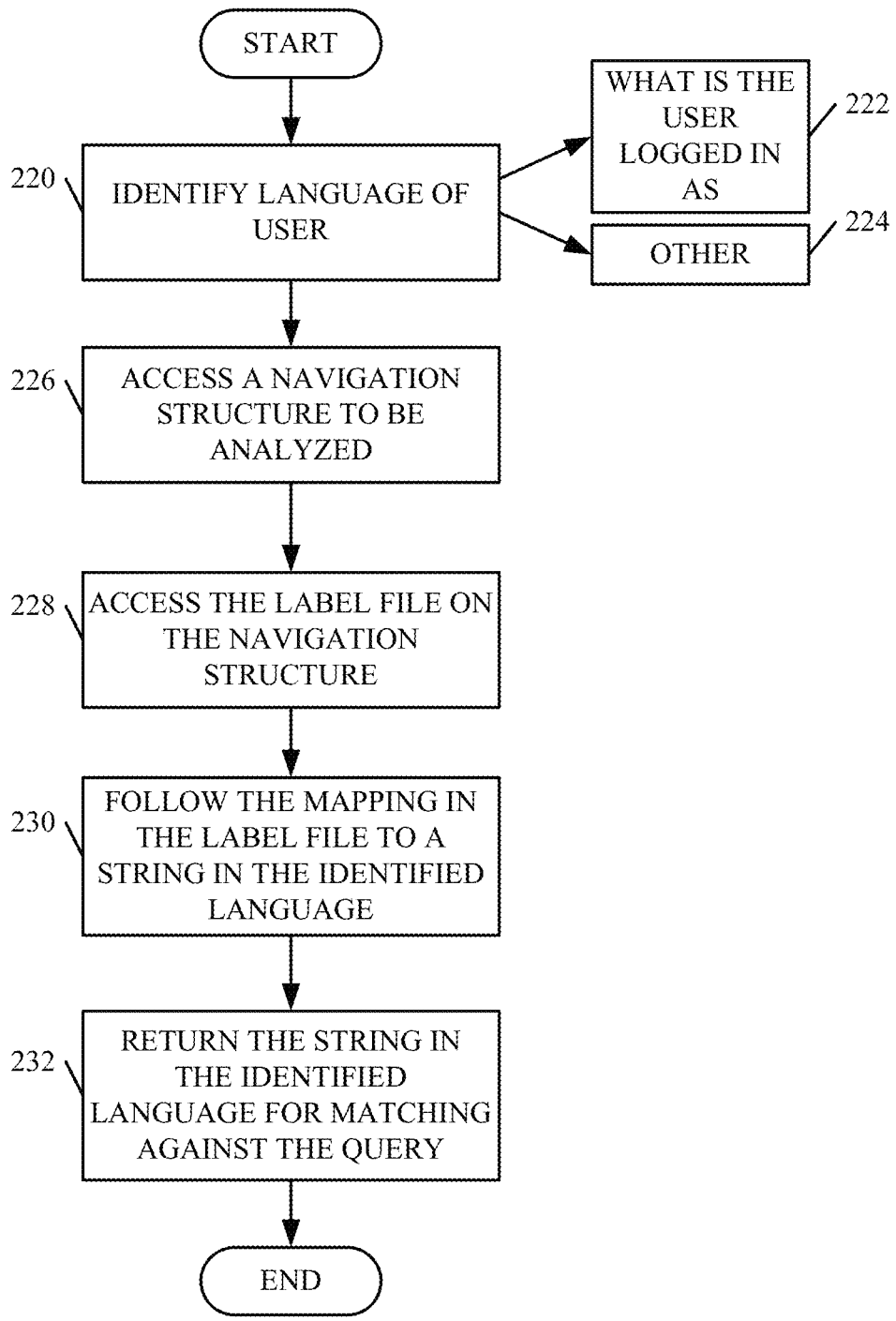
FIG. 3 is a flow diagram illustrating one example of the operation of a language resolver component shown in FIG. 1.

FIG. 3 is a flow diagram illustrating one example of the operation of language resolver component 150, in more detail. As search engine 152 is guided to traverse the metadata hierarchy 138, language resolver component 150 illustratively returns the description of the various nodes in the metadata hierarchy, in a desired language. In one example, that language is the language that user 108 used to input the search query. Therefore, in one example, language resolver component 150 first identifies the language of user 108. This is indicated by block 220. It can do so, for instance, by using a language identifier to determine the particular language that user 108 used for the query or used to log into computing system 102. This is indicated by block 222. It can also do so by identifying language preferences associated with user 108 through a user profile, or in other ways. This is indicated by block 224.

Component 150 then accesses a navigation structure to be analyzed. For instance, it accesses the navigation structure corresponding to a node in metadata hierarchy 138 that is being traversed by search engine 152. Accessing the navigation structure is indicated by block 226.

In one example, the navigation structure includes a label file. This is illustratively accessed by language resolver component 150. This is indicated by block 228.

The label file may illustratively include a mapping that maps to textual strings in various different languages. Based upon the language identified for user 108 (at block 220), language resolver component 150 follows the mapping in the label file that leads to a string in the identified language. This is indicated by block 230. It then returns that string for matching (by search engine 152) against the input query terms. This is indicated by block 232.

Figure 4A:
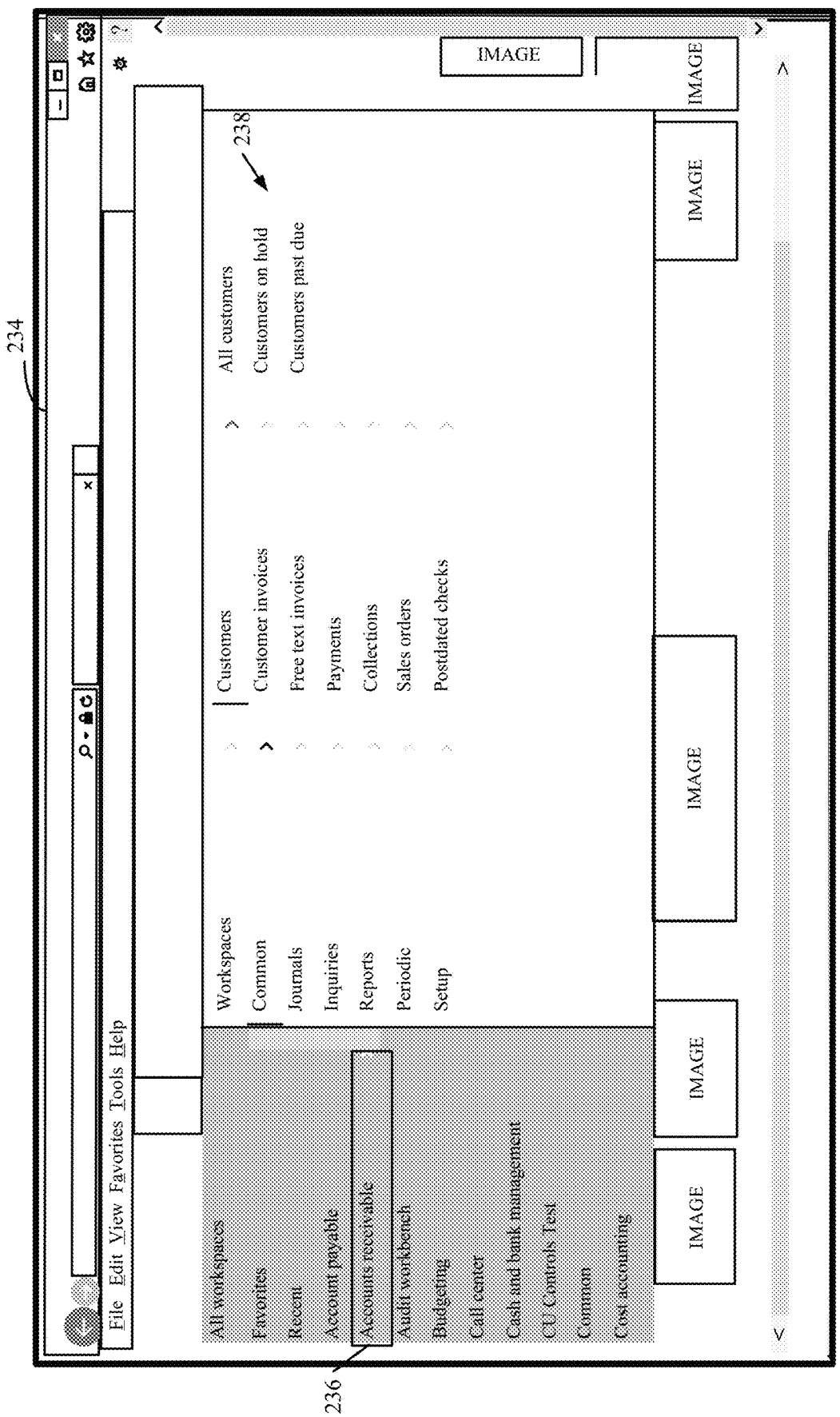

FIGS. 4A-4F show a number of different user interface displays that can be generated by system 118. FIG. 4A shows one example of a user interface display 234 that illustrates a navigation hierarchy (e.g., a navigation path) that leads to a corresponding entry point. It can be seen that the user has actuated the "Accounts Receivable" user input mechanism 236 and then selected the "Common" mechanism under Workspaces, then the "Customers" mechanism, and a resultant set of menu items is displayed at 238. The menu item (e.g., entry point) with a label "All Customers" is shown to reside under "Accounts Receivable→Common→Customers". This is illustratively the navigation hierarchy path that will be defined in metadata hierarchy 138 for arriving at the "All Customers" entry point (or menu item) within system 102. It will be noted that there may be one or more additional navigation paths in hierarchy 138 that also lead to the "All Customers" entry point.

Figure 4B:
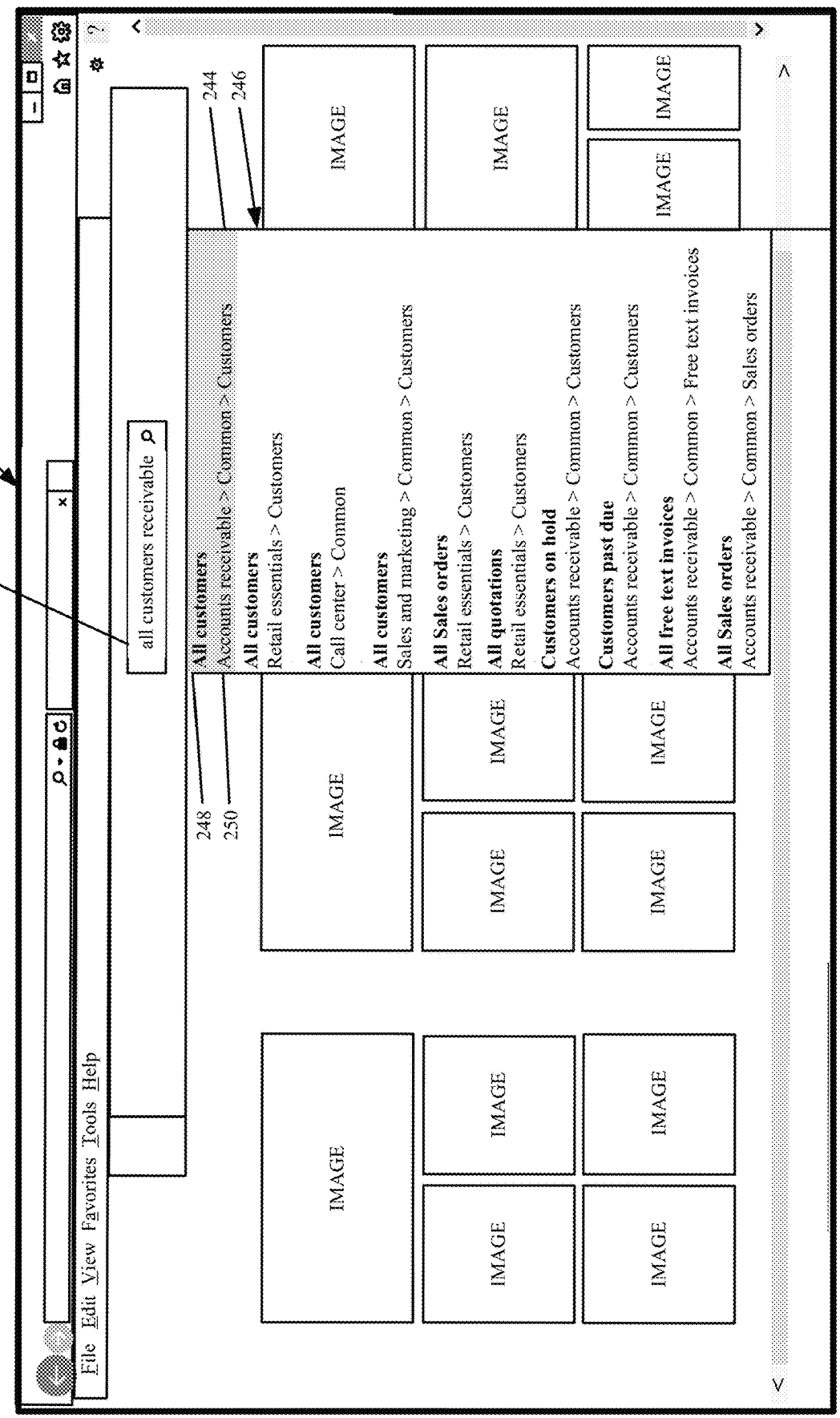

FIGS. 4B-4F show examples of user interface displays that show how a user can search for the "All Customers" entry point. FIG. 4B shows an example of a user interface display 240 where the user has entered the terms "All Customers Receivable" in a search user input mechanism (e.g., a search box) 242. System 118 then searches for entry points based on that input, finds search results, ranks them, applies security filters, and then surfaces those results for the user. It can be seen that, with the present example, the "All Customers" entry point is displayed as a first display element 244 in a results display section 146. Each of the display elements in results display portion 146 also illustratively displays the corresponding navigation path for each element. For instance, it can be seen in display element 244 that the "All Customers" node is displayed at 248. The navigation path that the user can take to arrive at the "All Customers" menu item is also displayed generally at 250. The same is true of each of the results displayed in results display portion 246.

Display portion 246 displays related results as well. For instance, other areas within computing system 102 that have entry points with the same or similar name are also listed.

Figure 4C:
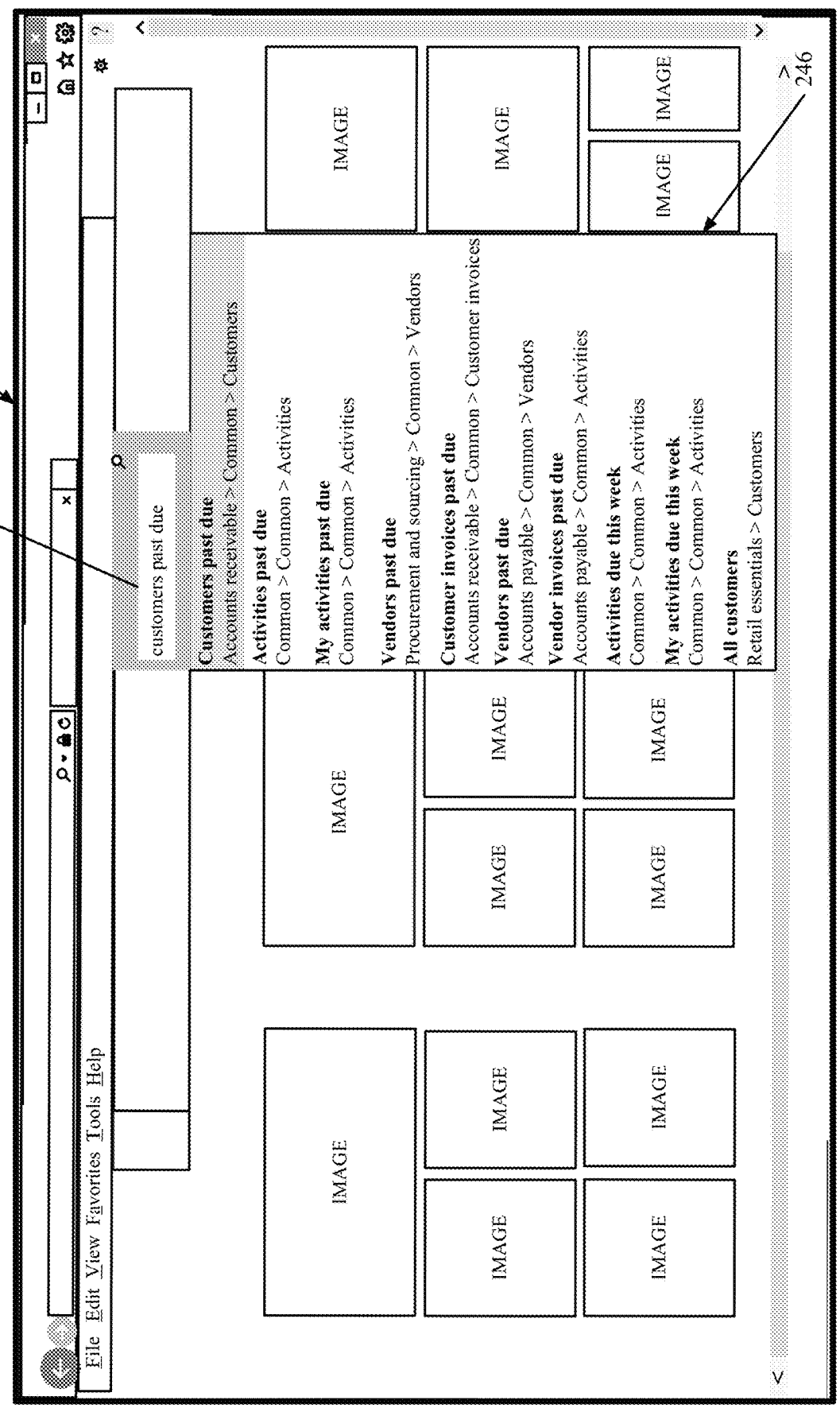

FIG. 4C shows another example of a user interface display 250 where the user has entered the terms "Customers Past Due" in query mechanism 242. The keywords "Customers Past Due" match the label for an entry point (e.g., a menu item) such as "Customers Past Due". The entry point with the exact match is listed at the top within results display portion 246. Other end points with non-exact matches are also shown.

Figure 4D:
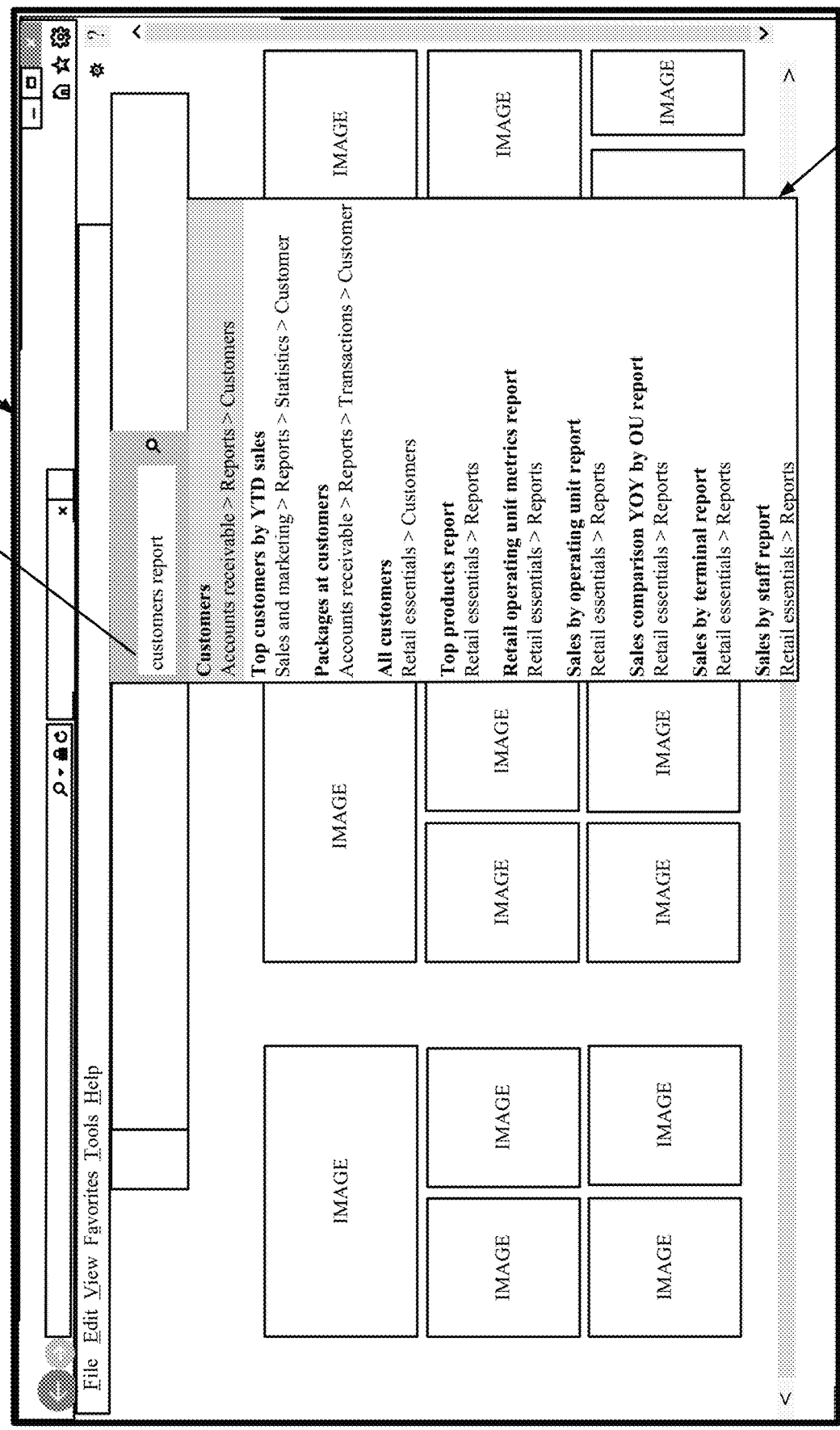

FIG. 4D shows another example of a user interface display 254. User interface display 254 shows an example where the search terms match not only the label of an entry point, but also labels of the corresponding hierarchy (e.g., menus) that the entry point appears under. In FIG. 4D, the user has entered the query terms "Customers Report". The term "Customers" illustratively matches a label for an entry point, and the term "Report" is in a label in the corresponding navigation path for the "Customers" entry point. For instance, the first result displayed in FIG. 4D matches the terms in the query in both the entry point itself, and also the navigation path. It can be seen in the first result that the navigation path is "Accounts Receivable→Reports→Customer→Customers". Thus, the search term "Customers" matches the entry point itself while the search term "Report" matches a portion of the hierarchical navigation path. Thus, it will be appreciated that search engine 152 is directed by navigation search provider 156 to analyze the terms in the navigation path and in the entry point in identifying matching search results.

Figure 4E:
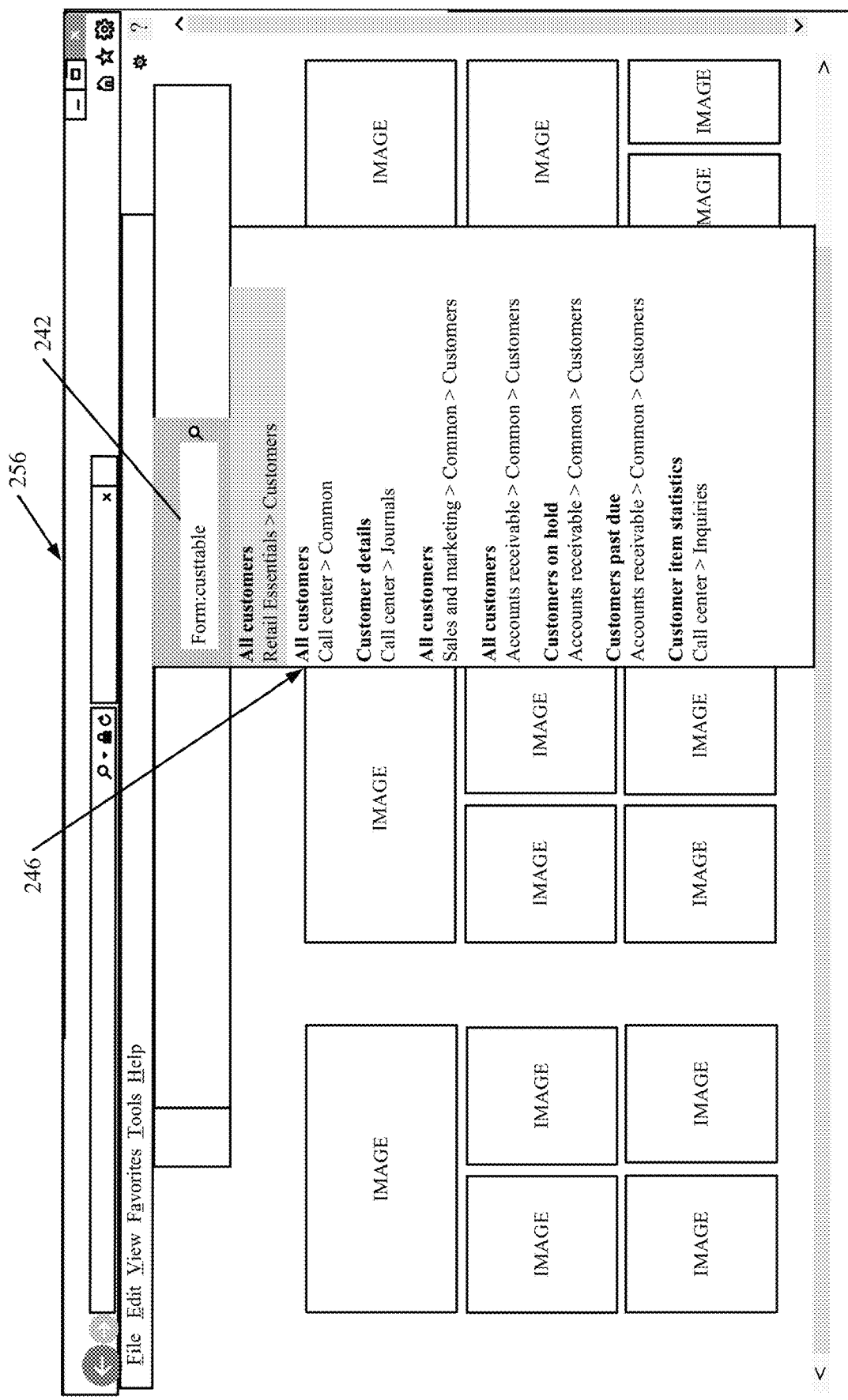

FIG. 4E shows another example of a user interface display 256. It may be that certain users are very familiar with computing system 102, and the various applications 132, forms 128, etc. Such users may search for forms using the actual form name given the forms within computing system 102. Navigation search provider 146 thus illustratively supports this type of directed searching. For instance, where the user enters a modifier such as "Form:", this may indicate to navigation search provider 146 that it is to search for a form that has a particular name that follows the modifier. By way of example, FIG. 4E shows that the user has entered the search query "Form: CustTable". Search engine 152 has identified that this form matches the "Retail Essentials-→Customers→All Customers" entry point, as well as others. They are displayed in results display portion 246. Thus, the operator can identify the entry point not only by the formal name that is given to the entry point within system 102, but also by the particular description that is found in the entry point's label.

FIG. 4F shows one example of a user interface display 158 that can be generated when the user navigates to one of the results displayed in the results display portion 246 (such as by clicking on it, tapping it, double clicking on it, etc.). It can be seen in user interface display 258 that the user has navigated to the "All Customers" entry point identified in FIG. 4E. In the example shown in FIG. 4F, application component 114 not only navigates user 108 to the corresponding entry point (e.g., the CustTable form), but it displays a confirmation display 260. Confirmation display 260 illustratively identifies the form as having the same form name input by the user in the search box 242 in FIG. 4E. Thus, the user can easily confirm that it is the proper form.

Figure 5A:
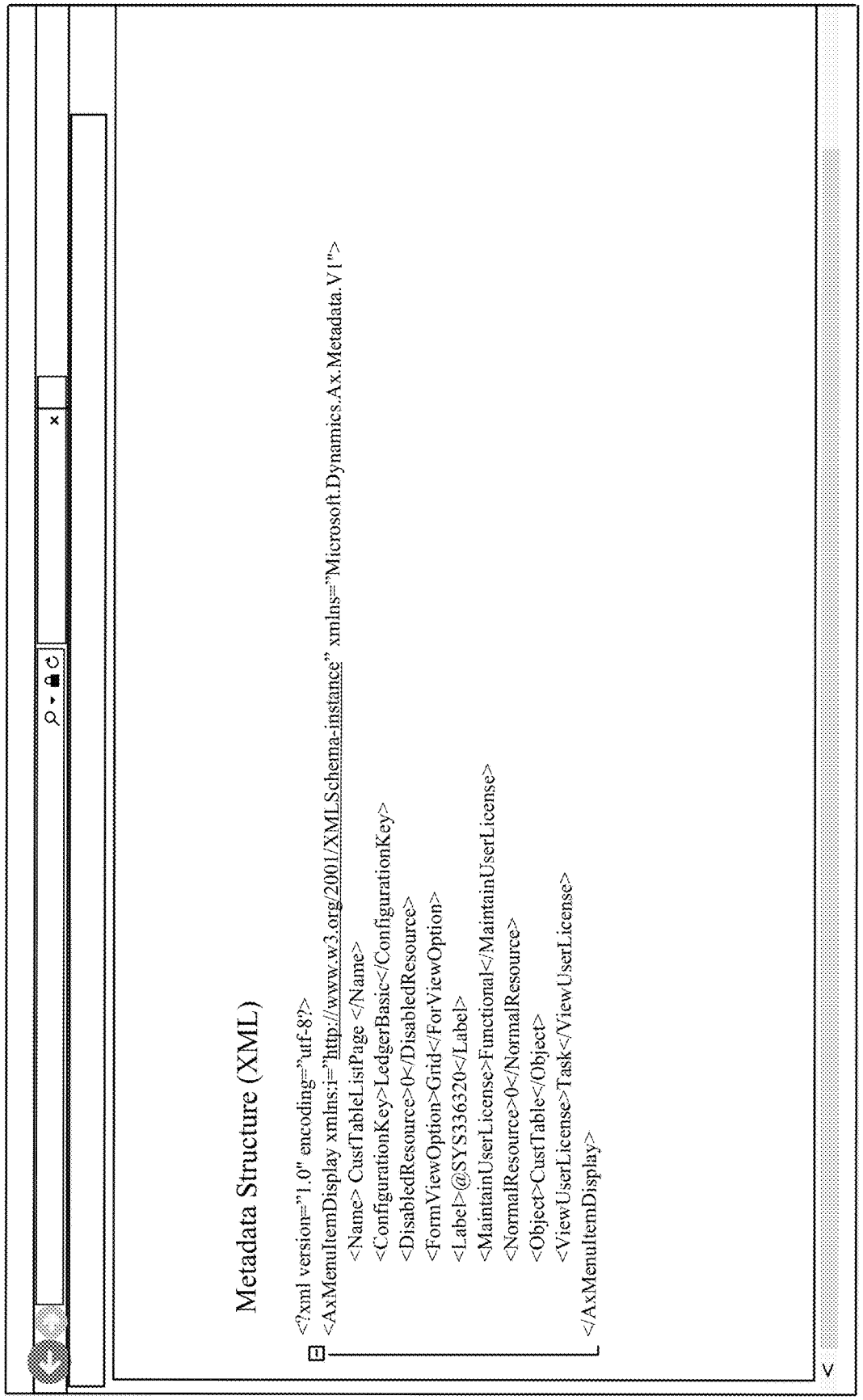
FIG. 5A shows one example of a metadata structure for a menu item entry point.
Figure 5B:
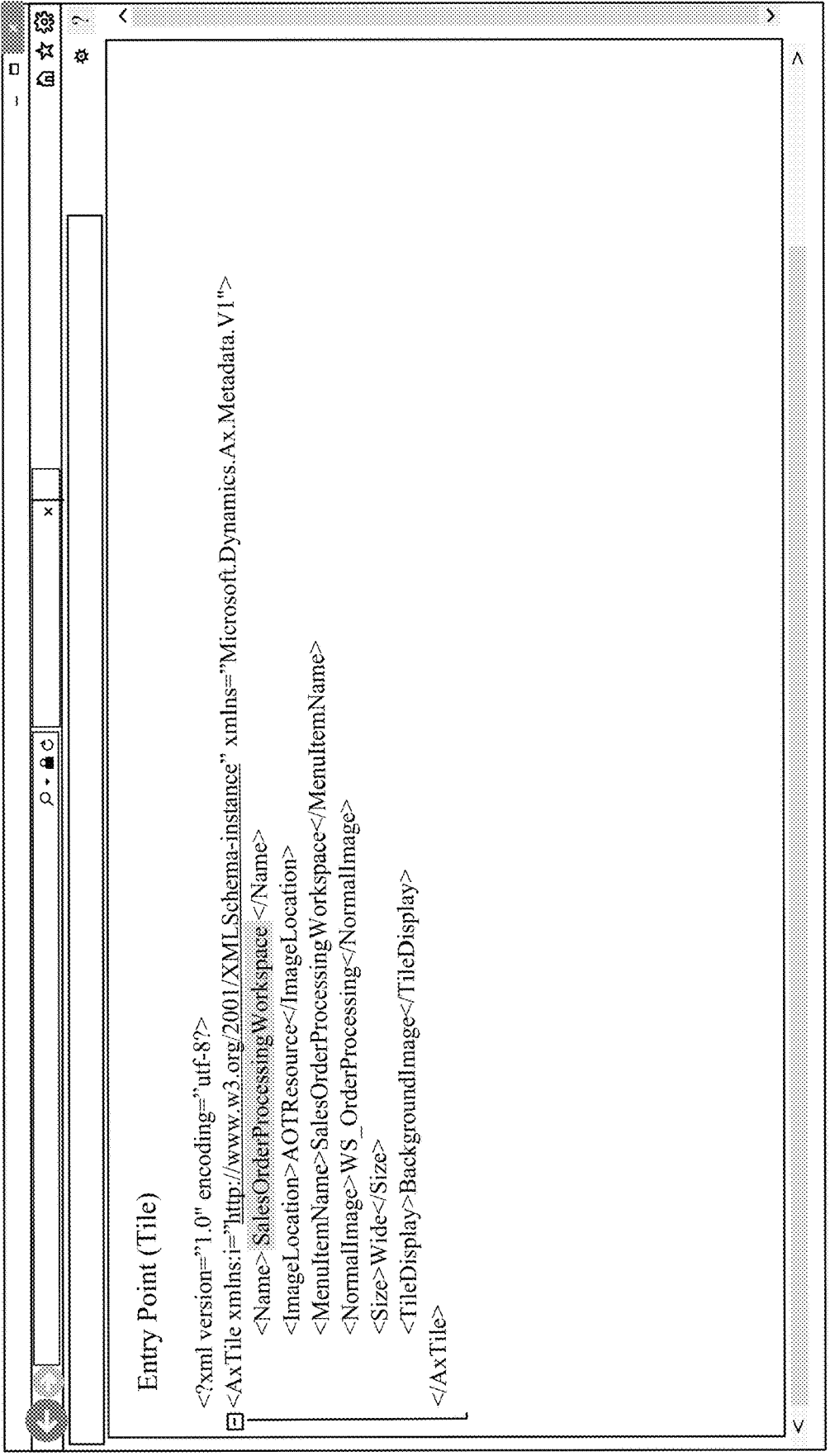
FIG. 5B shows one example of a metadata structure for a tile entry point.

FIGS. 5A-5C show various examples of metadata structures for different kinds of entry points. The representations are in XML. These are examples only. FIG. 5A shows an example of a menu item entry point. FIG. 5B shows an example of a tile entry point, and FIG. 5C shows an example of a menu navigation hierarchy entry point.

It can thus be seen that navigable entry point search system 118 illustratively allows a user to instantly search navigation structures from a user interface to find a desired entry point. In addition, the path in the navigation hierarchy where the entry point is located is also displayed along with the entry point. This can all be done without having to build any type of special index structure. Instead, the metadata hierarchy 138 of the deployed computing system is searched. This makes the search dynamic as well. If an entry point is added, deleted or updated, that will be reflected in the metadata hierarchy 138 of the deployed system. The search results thus automatically reflect the most up-to-date information, without any special processing after the changes are introduced into the deployed system. Security filter component 148 also illustratively considers the user's security role or security permissions, and language resolver component 150 considers the current language of the user such that only entry points that are permitted for the user are returned, and they are returned in the correct language, at runtime. Again, this is performed without any special configurations or indexing. Search engine 152 not only searches for the descriptions of the end points, but it also takes into account the full navigation path to the entry point. This allows it to find additional matching nodes. Further, users that are very familiar with system 102 can use a form name, or other inputs in the corresponding syntax that is used by system 102, to identify entry points as well.

This all significantly enhances the efficiency of system 102. Instead of needing to navigate through a wide variety of different navigation hierarchies to identify an entry point, user 108 can search for it very quickly. This saves round trips that are needed for multiple navigation inputs, and it also saves rendering overhead that is needed to render the various items surfaced while the user is navigating a hierarchical navigation path. It also significantly enhances the efficiency of user 108. Instead of having to provide repeated inputs and navigation inputs, user 108 need only provide a search term and can immediately identify entry points, as well as the navigation path leading to those entry points, and can quickly navigate to them directly from the result display.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
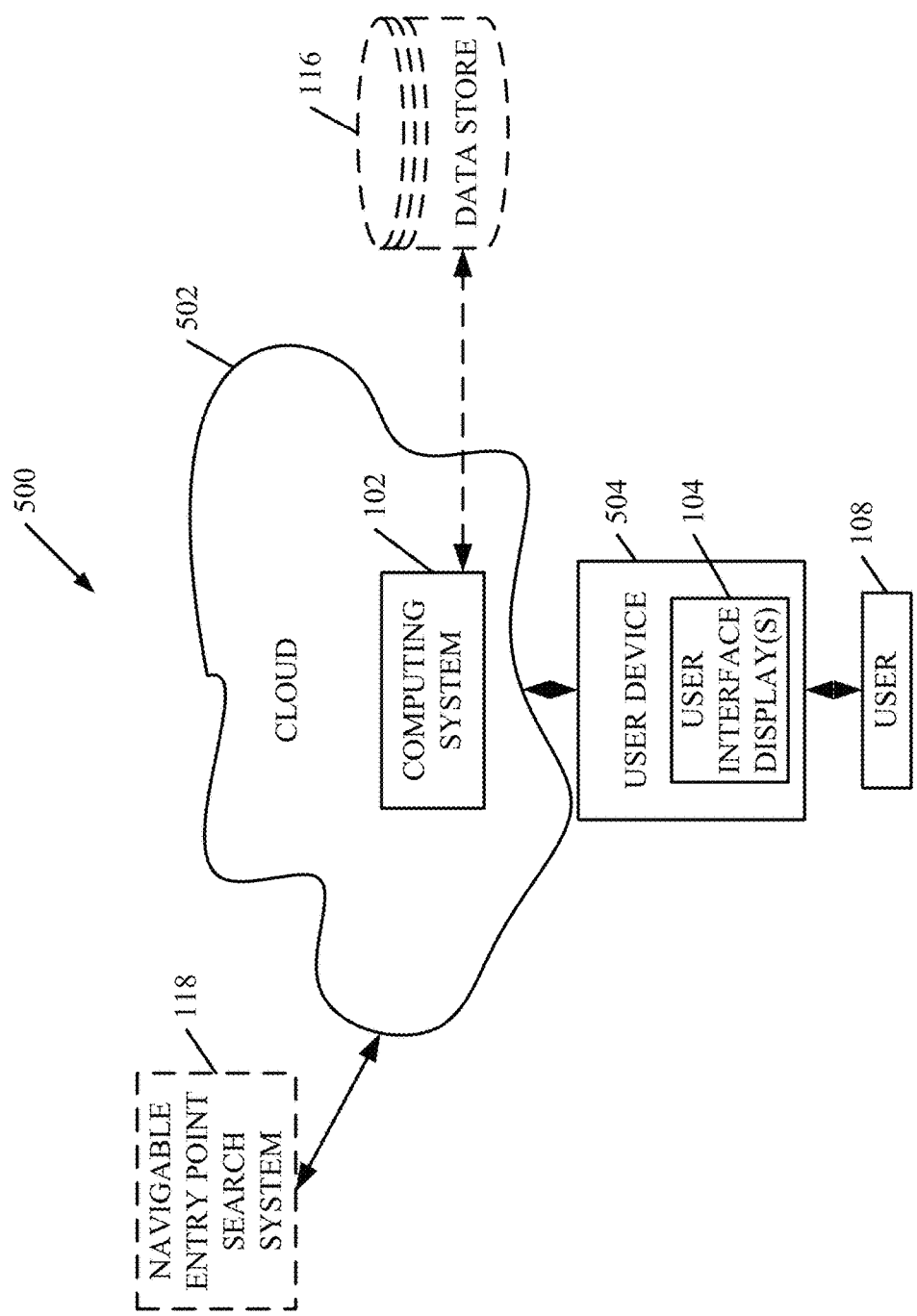
FIG. 6 shows the architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing system 102 can be located in cloud 502 (which can be public, private, or a combination where portions are public while others are private). Therefore, user 108 uses a user device 504 to access those systems through cloud 502.

FIG. 6 also depicts another example of a cloud architecture. FIG. 6 shows that it is also contemplated that some elements of computing system 102 can be disposed in cloud 502 while others are not. By way of example, data store 116 can be disposed outside of cloud 502, and accessed through cloud 502. In another example, navigable entry point search system 118 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
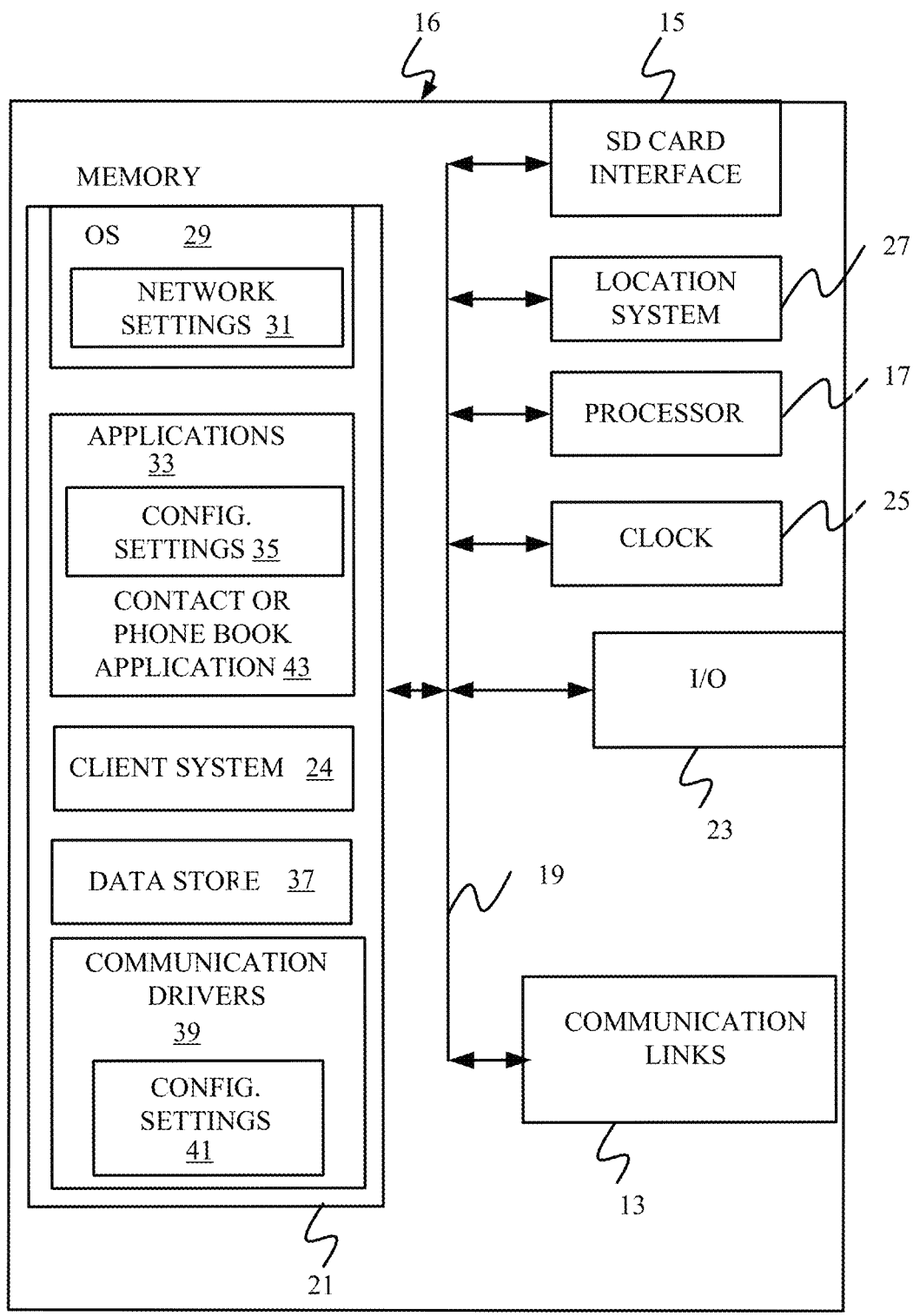
FIGS. 7-9 show examples of mobile devices, which can be used in the architectures shown above.
Figure 8:
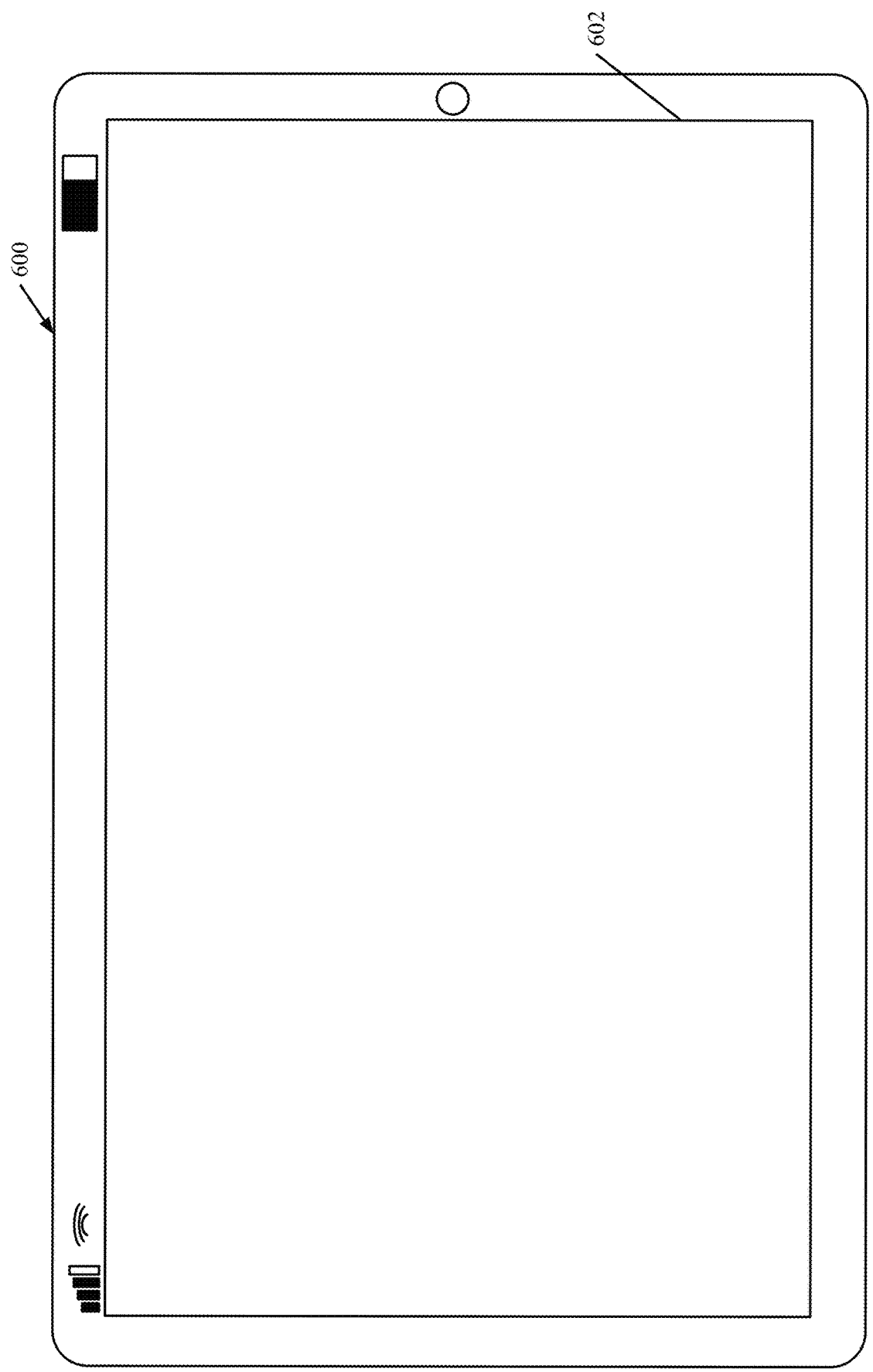
Figure 9:
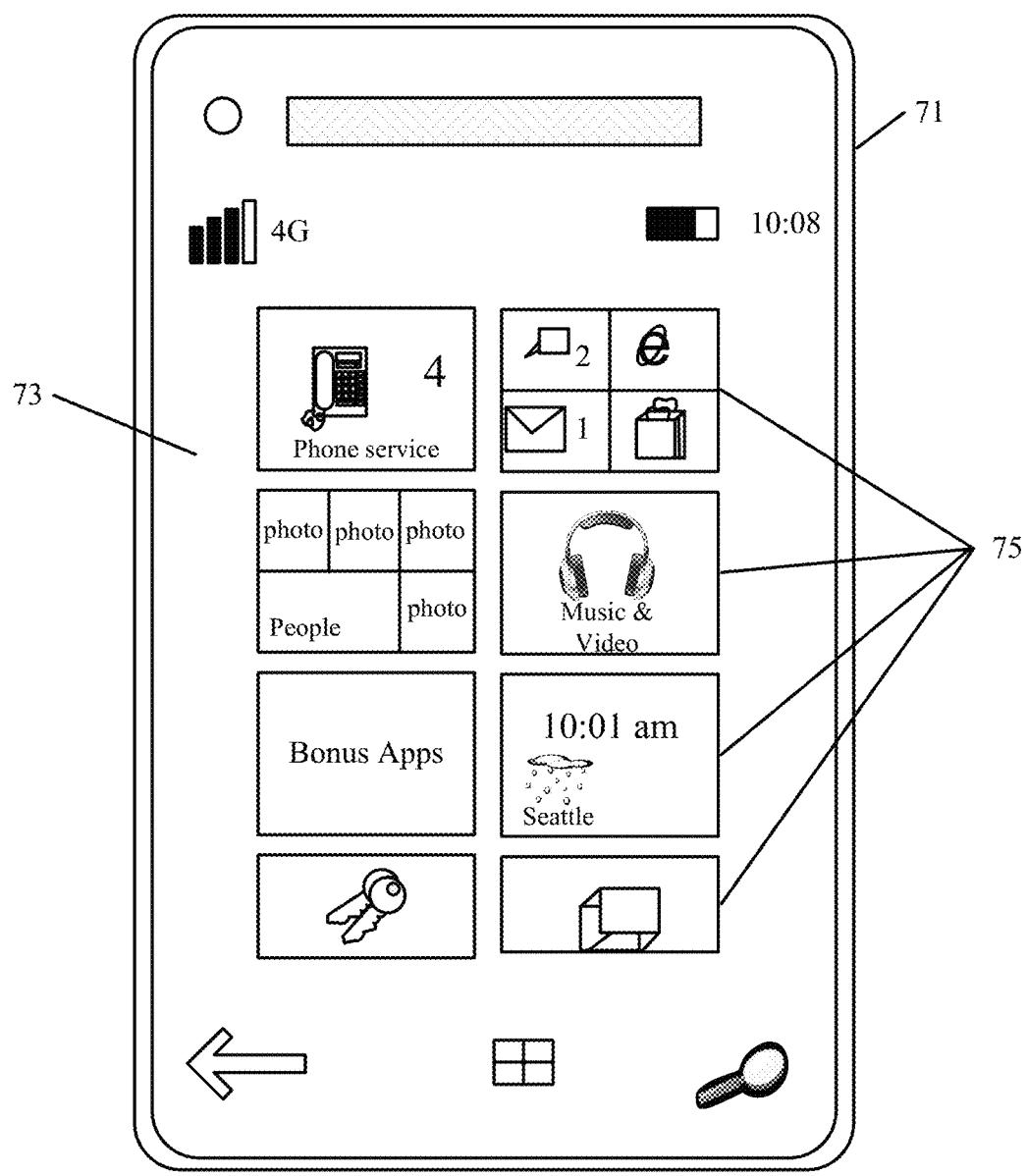

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components of computing system 102 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody servers or processors 110 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. The device can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples, the phone can also include a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 9 shows that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
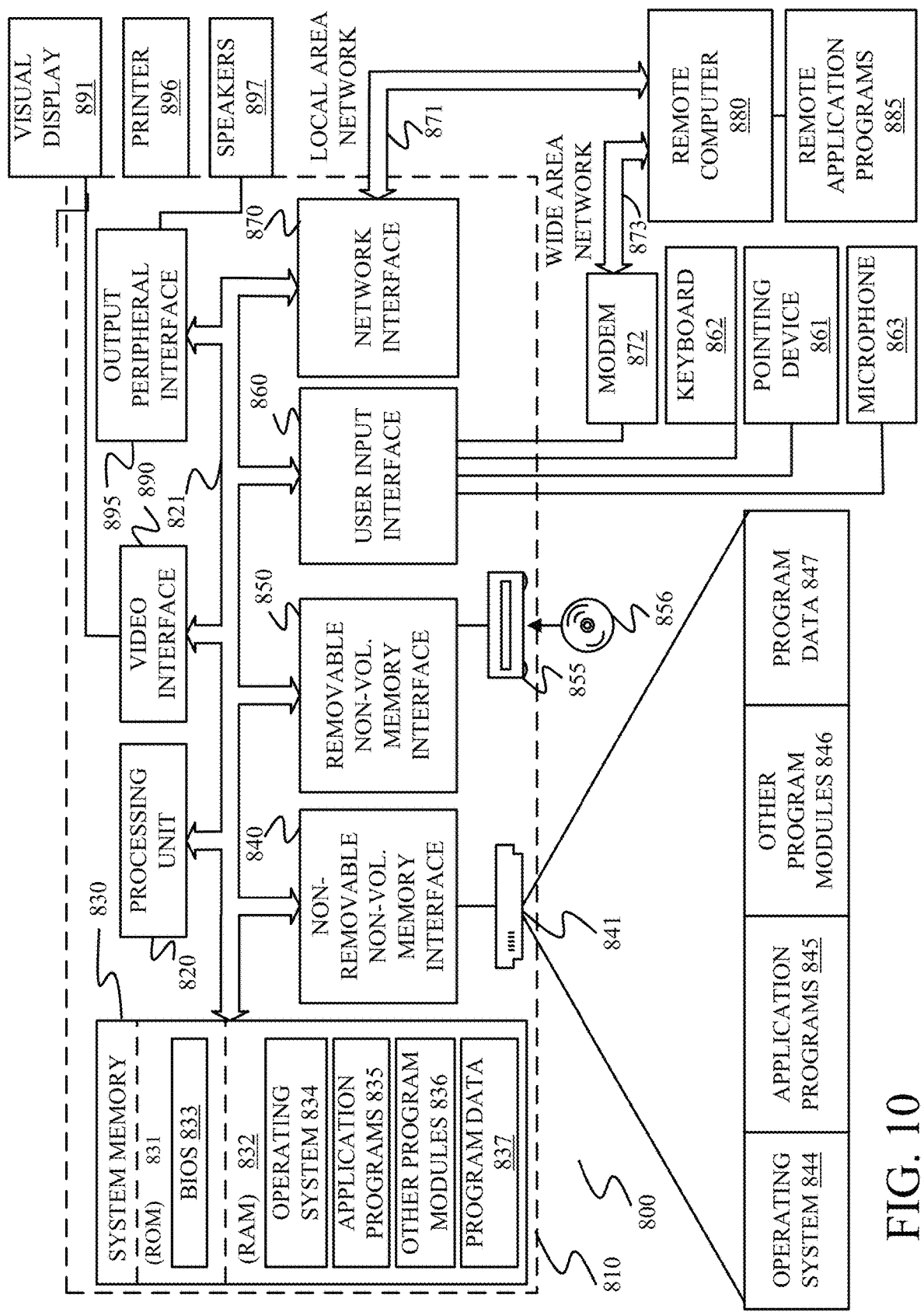
FIG. 10 is a block diagram of one example of a computing system environment that can be used in the architectures shown above.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processor or servers 110 or those in the other devices or systems discussed above), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user interface component; and
a navigable entry point search system configured to control the user interface component to surface a search user input mechanism and detect user actuation of the search user input mechanism indicative of a search input, the navigable entry point search system, in response to detecting the search input, searching a metadata hierarchy to identify entry point nodes, that represent entry points in a runtime instance of an application, based on the search input, and surface navigable search results, indicative of the identified entry point nodes, for user actuation.

Example 2 is the computing system of any or all previous examples wherein the navigable entry point search system comprises:
a navigation search provider that identifies the entry point nodes in the metadata hierarchy.

Example 3 is the computing system of any or all previous examples wherein the navigable entry point search system further comprises:
a navigable elements reader component that reads a textual description associated with each entry point node and returns the textual description.

Example 4 is the computing system of any or all previous examples wherein the navigable entry point search system further comprises:
a search engine that receives the textual description read by the navigable elements reader component and identifies matching entry points based on the search input and the textual description.

Example 5 is the computing system of any or all previous examples wherein the identified entry point nodes are language independent structures and each have a plurality of different textual descriptions in a plurality of different languages, and wherein the navigable entry point search system comprises:
a language resolver component that identifies a given textual description in a given language, for each of the identified entry point nodes, the navigable elements reader component returning the given textual description.

Example 6 is the computing system of any or all previous examples wherein the language resolver component identifies a language of usage by the user and identifies the given textual description as being a textual description in the language of usage.

Example 7 is the computing system of any or all previous examples wherein each entry point node has an associated navigation path that includes a set of hierarchical nodes in the metadata hierarchy and wherein the navigable elements reader component reads textual descriptions associated with each of the nodes in the set of hierarchical nodes and returns the textual descriptions to the search engine.

Example 8 is the computing system of any or all previous examples wherein the search engine identifies the matching entry point nodes based on the search input and the textual descriptions associated with the set of hierarchical nodes.

Example 9 is the computing system of any or all previous examples and further comprising:
a security filter component configured to filter the navigable search results surfaced for the user based on security permissions associated with the user.

Example 10 is the computing system of any or all previous examples wherein the entry point search provider identifies the entry point nodes as nodes belonging to a pre-defined set of nodes.

Example 11 is the computing system of any or all previous examples wherein the navigable entry point search system includes a plurality of search providers that each search a separate metadata hierarchy, and further comprising:
a results aggregator component that aggregates search results returned by each of the search providers.

Example 12 is the computing system of any or all previous examples wherein the runtime instance of the application has a plurality of user interface forms defined in the metadata hierarchy, wherein the navigation search provider identifies the search input as being directed to a form name and controls the search engine to search the metadata hierarchy to identify user interface forms based on the form names matching the search input.

Example 13 is a computer implemented method, comprising:

controlling a user interface component to surface a search user input mechanism;

detecting user actuation of the search user input mechanism indicative of a search input;

in response to detecting the search input, searching a metadata hierarchy to identify entry point nodes, that represent entry points in a runtime instance of an application, based on the search input; and controlling the user interface component to surface navigable search results, indicative of the identified entry point nodes, for user actuation.

Example 14 is the computer implemented method of any or all previous examples wherein searching the metadata hierarchy to identify entry point nodes further comprises:

reading a textual description associated with each entry point node;

returning the textual description to a search engine; and identifying, with the search engine, matching entry points based on the search input and the textual description.

Example 15 is the computer implemented method of any or all previous examples wherein the identified entry point nodes are language independent structures and each have a plurality of different textual descriptions in a plurality of different languages, and wherein reading a textual description comprises:

identifying a given textual description in a given language, for each of the identified entry point nodes; and returning the given textual description.

Example 16 is the computer implemented method of any or all previous examples wherein each entry point node has an associated navigation path that includes a set of hierarchical nodes in the metadata hierarchy and wherein reading the textual descriptions comprises reading the textual descriptions associated with each of the nodes in the set of hierarchical nodes and returning the textual descriptions to the search engine, wherein the search engine identifies the matching entry point nodes based on the search input and the textual descriptions associated with the set of hierarchical nodes.

Example 17 is the computer implemented method of any or all previous examples and further comprising:

filtering the navigable search results surfaced for the user based on security permissions associated with the user.

Example 18 is the computer implemented method of any or all previous examples wherein the runtime instance of the application has a plurality of user interface forms defined in the metadata hierarchy, wherein searching the metadata hierarchy comprises:

identifying the search input as being directed to a form name; and controlling the search engine to search the metadata hierarchy to identify user interface forms based on the form names matching the search input.

Example 19 is a computing system, comprising:

a user interface component; and a navigable entry point search system configured to control the user interface component to surface a search user input mechanism and detect user actuation of the search user input mechanism indicative of a search input a navigation search provider that, in response to detecting the search input, searches a metadata hierarchy to identify entry point nodes, that represent entry points in a runtime instance of an application;

a navigable elements reader component that reads a textual description associated with each identified entry point node and returns the textual description; and a search engine that receives the textual description read by the navigable elements reader component, identifies matching entry points based on the search input and the textual description, and surfaces navigable search results, indicative of the identified entry point nodes, for user actuation.

Example 20 is the computing system of any or all previous examples and further comprising:

a security filter component configured to filter the navigable search results surfaced for the user based on security permissions associated with the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to:
  generate a representation of a search user input mechanism;
  based on an indication of actuation of the search user input mechanism by a user, generate a search term;
  search a metadata hierarchy that defines a set of hierarchical graphical user interfaces comprising a hierarchical menu structure, each hierarchical graphical user interface comprising an entry point in a runtime instance of an application having one or more user input mechanisms configured to access data functionality associated with the computing system, and having a description of the hierarchical graphical user interface;
  identify a subset of the hierarchical graphical user interfaces based on a comparison of the descriptions and the search term;
  rank the subset of hierarchical graphical user interfaces based on where the search term occurs in a navigation path defined in the metadata heirarchy;
  generate a representation of a set of user-actuatable display elements based on the ranking, wherein each display element corresponds to a graphical user interface in the identified subset and displays at least a portion of the navigation path defined in the metadata hierarchy for accessing the corresponding graphical user interface; and
  based on an indication of actuation of a particular one of the user-actuatable display elements, navigate to the graphical user interface represented by the particular user-actuatable display element.

2. The computing system of claim 1 wherein the description comprises a textual description, and the instructions configure the computing system to:
  read the textual description associated with each graphical user interface in the set of hierarchical graphical user interfaces; and return the textual description for each graphical user interface in the set of hierarchical graphical user interfaces.

3. The computing system of claim 2 wherein the instructions configure the computing system to:
identify the subset of the graphical user interfaces as matching entry points having a textual description that matches the search term.

4. The computing system of claim 3 wherein the set of hierarchical graphical user interfaces comprises a plurality of user interface forms defined in the metadata hierarchy, wherein the instructions configure the computing system to:
identify the search term as being directed to a form name; and
search the metadata hierarchy to identify user interface forms based on the form names matching the search.

5. The computing system of claim 4 wherein the identified subset of graphical user interfaces are language independent structures and each have a plurality of different textual descriptions in a plurality of different languages, and wherein the instructions configure the computing system to
identify a given textual description in a given language, for each graphical user interface in the subset; and
identify a language of usage by the user and identify the given textual description as being a textual description in the language of usage.

6. The computing system of claim 1 wherein the navigation path for accessing each corresponding graphical user interface includes a set of hierarchical nodes in the metadata hierarchy and wherein the instructions configure the computing system to return textual descriptions associated with each of the nodes in the set of hierarchical nodes.

7. The computing system of claim 6 wherein the instructions configure the computing system to identify the matching entry point nodes based on the search input and the textual descriptions associated with the set of hierarchical nodes.

8. The computing system of claim 3 wherein the instructions configure the computing system to:
filter the navigable search results surfaced for the user based on security permissions associated with the user.

9. A computer implemented method, comprising:
generating a representation of a search user input mechanism;
based on an indication of actuation of the search user input mechanism by a user, generating a search term;
searching a metadata hierarchy that defines a set of hierarchically-related entry point nodes comprising language independent structures, each entry point node having a plurality of different textual descriptions in a plurality of different languages and representing a graphical user interface in a runtime instance of an application, the graphical user interface comprising one or more user input mechanisms configured to access data functionality associated with the application, wherein searching the metadata hierarchy comprises:
identifying a given textual description in a given language, for each entry point node;
returning the given textual description; and
identifying matching graphical user interfaces based on the search input and the given textual description;
identifying a subset of the entry point nodes based on the identified matching graphical user interfaces; and
generating a representation of a set of user-actuatable display elements, wherein each display element corresponds to a particular graphical user interface represented by the subset of entry point nodes, and identifies a portion of the metadata hierarchy corresponding to the particular graphical user interface; and
based on an indication of actuation of a particular one of the user-actuatable display elements, navigate to the graphical user interface represented by the particular user-actuatable display element.

10. The computer implemented method of claim 9 wherein each entry point node has an associated navigation path that includes a set of hierarchical nodes in the metadata hierarchy and wherein reading the textual descriptions comprises:
reading the textual descriptions associated with each of the nodes in the set of hierarchical nodes;
returning the textual descriptions; and
identify the matching entry point nodes based on the search input and the textual descriptions associated with the set of hierarchical nodes.

11. The computer implemented method of claim 9 and further comprising:
filtering the navigable search results surfaced for the user based on security permissions associated with the user.

12. A computer-implemented method comprising:
generating a representation of a search user input mechanism;
based on an indication of actuation of the search user input mechanism by a user, generating a search term;
searching a metadata hierarchy that defines a set of hierarchical graphical user interfaces comprising a hierarchical menu structure, each hierarchical graphical user interface comprising an entry point in a runtime instance of an application having one or more user input mechanisms configured to access data functionality associated with the application, and having a description of the hierarchical graphical user interface;
identifying a subset of the hierarchical graphical user interfaces based on a comparison of the descriptions and the search term;
ranking the subset of hierarchical graphical user interfaces based on where the search term occurs in a navigation path defined in the metadata hierarchy;
generating a representation of a set of user-actuatable display elements based on the ranking, wherein each display element corresponds to a graphical user interface in the identified subset and displays at least a portion of the navigation path defined in the metadata hierarchy for accessing the corresponding graphical user interface; and
based on an indication of actuation of a particular one of the user-actuatable display elements, navigating to the graphical user interface represented by the particular user-actuatable display element.

13. The computer-implemented method of claim 12, wherein the description comprises a textual description, and the method comprises:
reading the textual description associated with each graphical user interface in the set of hierarchical graphical user interfaces; and
returning the textual description for each graphical user interface in the set of hierarchical graphical user interfaces.

14. The computer-implemented method of claim 13, and further comprising:
identifying the subset of the graphical user interfaces as matching entry points having a textual description that matches the search term.

15. The computer-implemented method of claim 14, wherein the set of hierarchical graphical user interfaces comprises a plurality of user interface forms defined in the metadata hierarchy, and the method comprises:

identifying the search term as being directed to a form name; and searching the metadata hierarchy to identify user interface forms based on the form names matching the search.

16. The computer-implemented method of claim 12, wherein the navigation path for accessing each corresponding graphical user interface includes a set of hierarchical nodes in the metadata hierarchy, and the method comprises returning textual descriptions associated with each of the nodes in the set of hierarchical nodes.

17. The computer-implemented method of claim 16, and further comprising identifying the matching entry point nodes based on the search input and the textual descriptions associated with the set of hierarchical nodes.

18. The computer-implemented method of claim 12 and further comprising:

filtering the navigable search results surfaced for the user based on security permissions associated with the user.

\* \* \* \* \*